United States Patent [19]

Giallourakis et al.

[11] 4,043,587

[45] Aug. 23, 1977

[54] BUG DEFLECTING DEVICES

[76] Inventors: Michael A. Giallourakis, 509-11 Pinellas Ave., Tarpon Springs, Fla. 33589; Louis F. Mlecka, P.O. Box 908, Brooksville, Fla. 33512

[21] Appl. No.: 675,571

[22] Filed: Apr. 9, 1976

[51] Int. Cl.$^2$ .............................................. B60J 1/20
[52] U.S. Cl. .................................... 296/91; 296/97 D
[58] Field of Search ..................... 296/91, 1 S, 97 D

[56] References Cited

U.S. PATENT DOCUMENTS

| 2,338,199 | 1/1944 | Parke | 296/91 |
| 2,644,716 | 7/1953 | McVicker | 296/91 |
| 3,022,109 | 2/1962 | Hauskama | 296/97 D |

Primary Examiner—Philip Goodman
Attorney, Agent, or Firm—M. Ted Raptes

[57] ABSTRACT

The invention relates to devices removably mountable by magnetic means on a metallic hood of motor vehicle for deflecting air currents containing bugs, road grime, etc., to prevent contact thereof with the windshield of the vehicle. The deflecting devices generally comprise a horizontal base member containing semi-rigid, flexible, strip, permanent magnet members, and a transparent shield canted backwardly and connected to the base. The device is molded of a semi-rigid, flexible plastic material which permits the shield and base to flex with the air currents produced when the vehicle is in motion.

2 Claims, 15 Drawing Figures

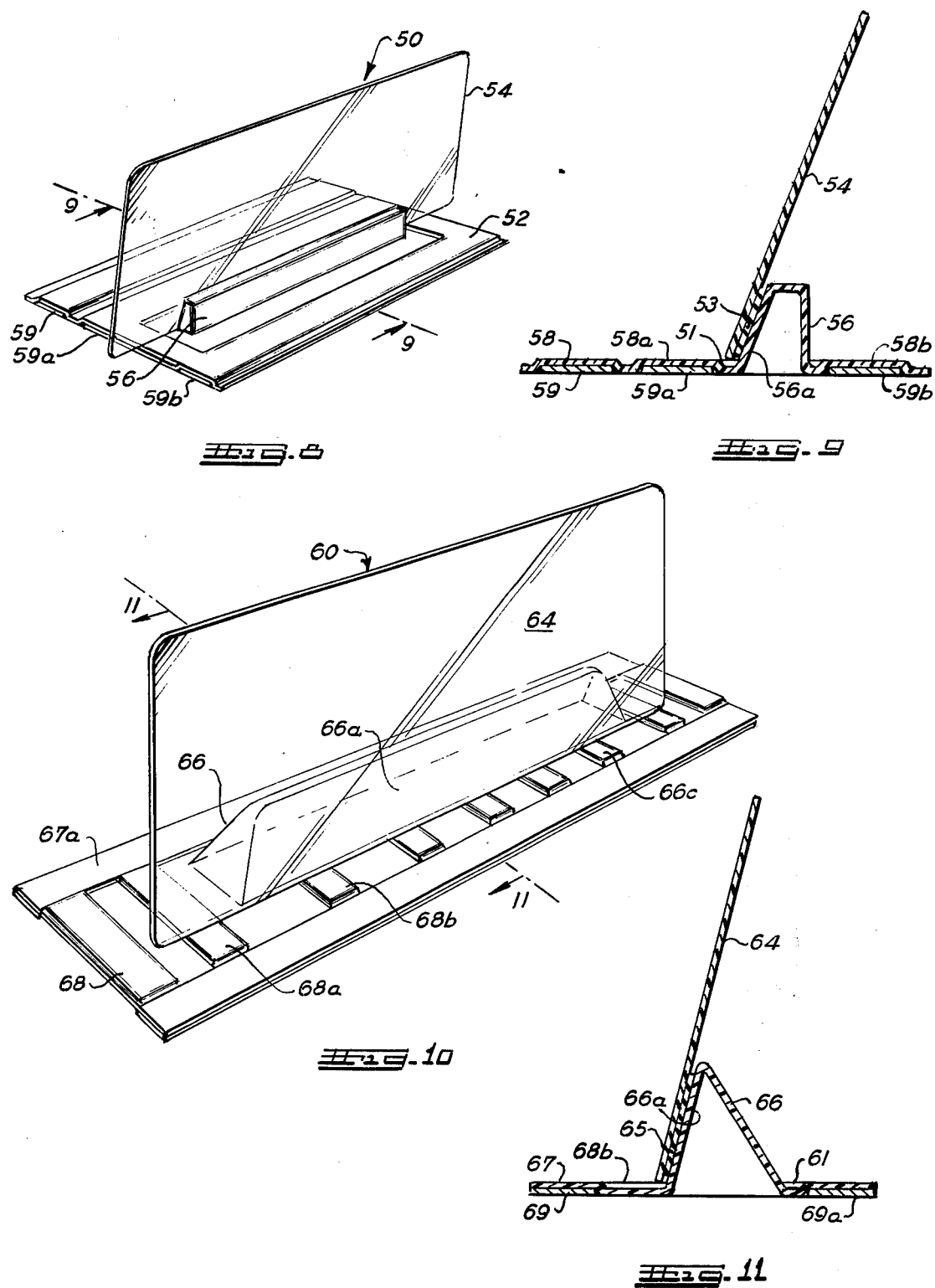

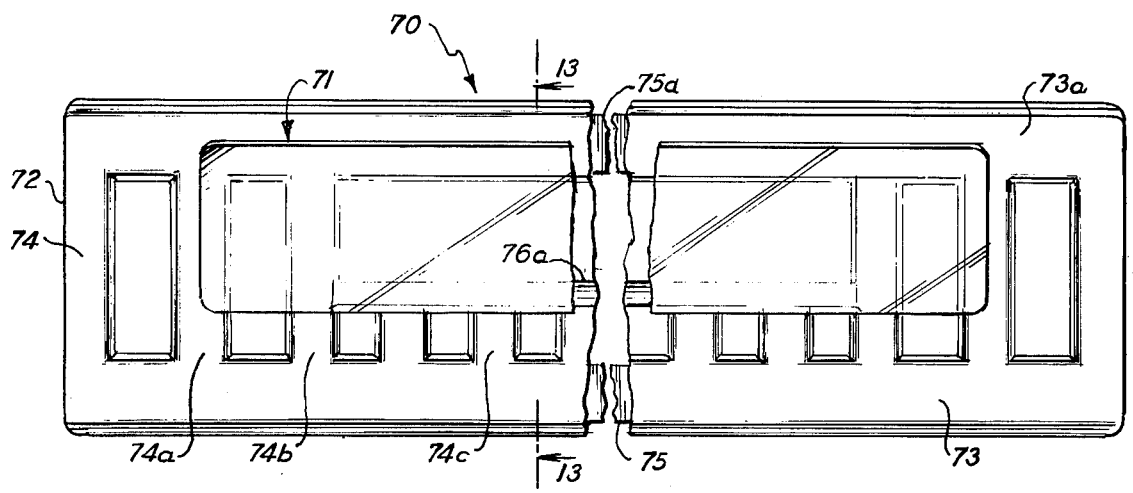
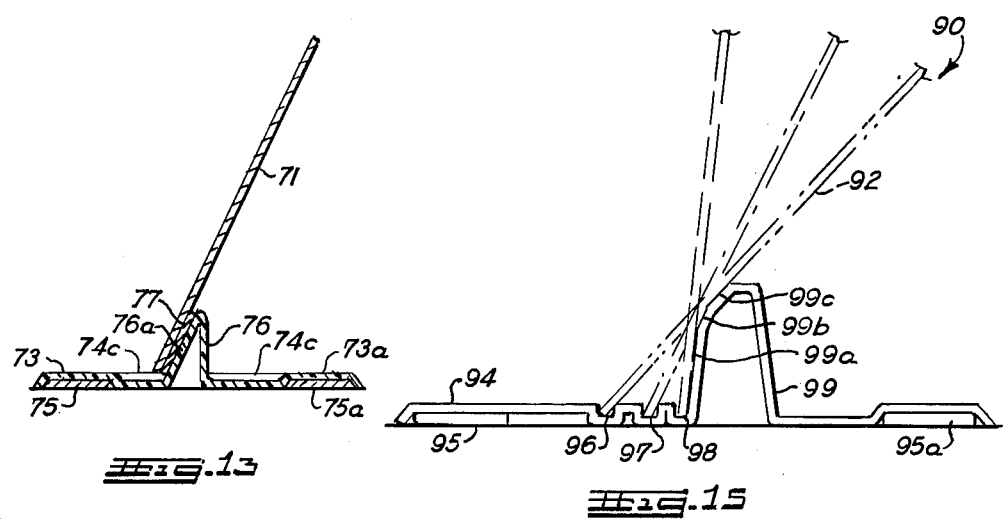
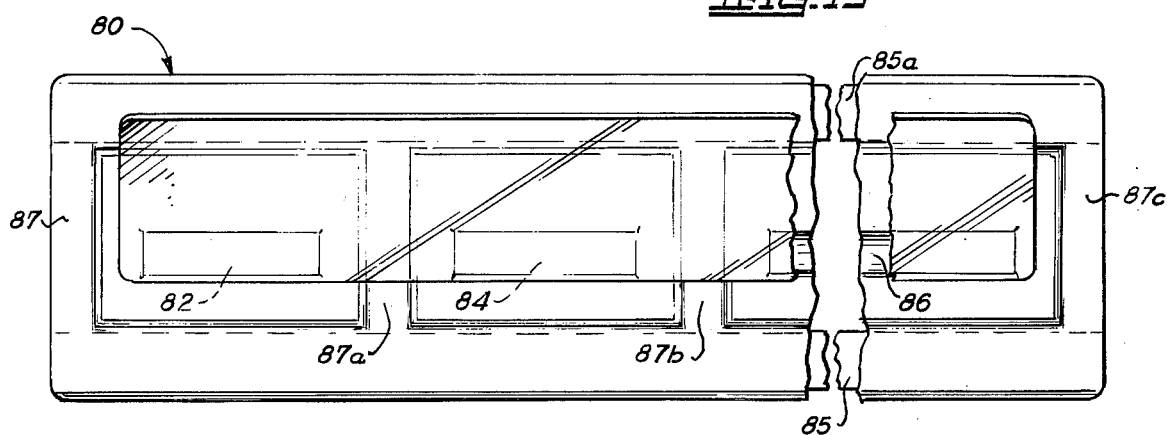

BUG DEFLECTING DEVICES

BACKGROUND OF THE INVENTION

This invention relates to novel removably mountable deflecting devices which aid in maintaining the windshield of a motor vehicle free from bugs, insects, road grime, etc. More particularly, the invention relates to deflecting devices mountable magnetically to a metallic hood of a motor vehicle to provide an efficient deflection of bugs, etc., away from the windshield during movement of the vehicle.

An annoying and difficult problem encountered in driving a motor vehicle is maintaining a clean windshield. Air currents encountered and created by the motor vehicle during movement can carry various contaminants such as road grime, dust, dirt, bugs, insects, etc., as well as rain, snow and sleet which can impinge on a windshield. Periodically, it becomes necessary and an inconvenience to clean the windshield to remove these contaminants. In particular, bugs and insects can splatter and stick to windshields, which on hot days become baked tenaciously to the surface of the windshield. Removal of these insects and bugs from the windshield is especially difficult.

Many devices have been developed for deflecting the air currents carrying the bugs, grime, etc., to prevent contact with the windshield. Many of the devices are of the permanent installation type requiring holes to be drilled into the body of the motor vehicle for their installation. Typical devices of this type are shown in U.S. Pat. Nos. 3,815,700 and 3,831,969. Prior patents also disclose deflector devices which are not permanently installed and are held in place by suction cups which attach to the surface of the hood of the vehicle. U.S. Pat. No. 2,220,715 discloses deflector devices which are sheet metal vane plates which can be inclined to any vertical angle, and are secured to the hood of the vehicle by suction cups. U.S. Pat. No. 2,236,846 discloses deflector devices which are glass plates and are capable of being inclined to any vertical angle, and are secured to the hood by suction cups.

Although the devices discussed above perform their intended function fairly satisfactory, it is undesirable and expensive to have permanently installed deflector devices, which also present a problem in washing the vehicle. Furthermore, those disclosed as being held with suction cups do not adhere in a perfectly secure manner, and can present a dangerous and annoying problem in the event one of the suction cups becomes detached from the surface and the device becomes dislodged from the hood while the car is in motion. Thus, although the above prior art devices aid in deflecting matter from a vehicle's windshield, their use has been limited and not particularly satisfactory.

SUMMARY OF THE INVENTION

This invention provides novel deflecting devices which can be easily mounted on and removable from metallic hoods of motor vehicles by magnetic means. Each device generally comprises a horizontal, semi-rigid, flexible base member which contains semi-rigid, strip, permanent magnets, and a semi-rigid, transparent, generally upstanding deflector shield connected to the base member.

The deflecting devices of the invention are adapted to be magnetically mounted at any position on the hood of the vehicle, and desirably at a position near the windshield which will provide the most efficient deflection or control of air currents created by movement of the vehicle to prevent bugs, etc., from impinging on the windshield. The optimum positioning of the deflecting devices on a vehicle's hood will vary with the design of the vehicle and the speed of the vehicle as well as the actual speed of the air currents encountered.

It is therefore an object of this invention to provide novel, improved deflecting devices which can be magnetically mounted at any desired position on a metallic hood of a motor vehicle, for obtaining the maximum deflection or control of air currents away from the windshield.

Another object of the invention is to provide novel improved deflecting devices comprising strong durable plastic material comprising permanent magnets for removably mounting the device on the metallic hood of a motor vehicle, which will control or deflect the air currents encountered by a moving motor vehicle away from the windshield, and which devices will be retained on the hood even at high speeds of the motor vehicle.

A further object of this invention is to provide novel, improved deflecting devices which comprise a horizontal mounting base member containing strip permanent magnets, and a generally upstanding transparent deflector shield.

An additional object of this invention is to provide novel, improved deflecting devices constructed of semi-rigid, flexible plastic materials which are inexpensive and easy to manufacture, and which will not present a hazard in their use on hoods of motor vehicles, because they are securely retained on the hood of a vehicle by relatively strong permanent magnets. In addition, the design of the deflecting device aids in the prevention of the device from becoming dislodged from the hood during movement of the vehicle.

Other and further objects and advantages of the present invention will be apparent from the following detailed description, drawings and claims of various specific embodiments and it is understood that changes may be made in the form, size, proportions and minor details of construction without departing from the spirit and scope of the invention.

BRIEF DESCRIPTION OF THE DRAWINGS

FIG. 8 is a perspective view of a second embodiment of a deflecting device according to this invention;

FIG. 9 is a sectional view taken along line 9—9 of FIG. 9;

FIG. 10 is a perspective view of a third embodiment of a deflecting device according to this invention;

FIG. 11 is a sectional view taken along line 11—11 of FIG. 10;

FIG. 12 is a top plan view of a fourth embodiment of a deflecting device according to this invention;

FIG. 13 is a sectional view taken along line 13—13 of FIG. 12;

FIG. 14 is a top plan view of a fifth embodiment of a deflecting device according to the invention; and FIG. 15 is a side plan view of a sixth embodiment of a deflecting device according to the invention.

DESCRIPTION OF THE PREFERRED EMBODIMENTS

Briefly, the deflector devices of the present invention comprise a flexible, semi-rigid, horizontal base member containing flexible, semi-rigid strip magnets and a flexible, semi-rigid upright shield which is connected to the base, and has a slightly backward cant.

Figure 1:
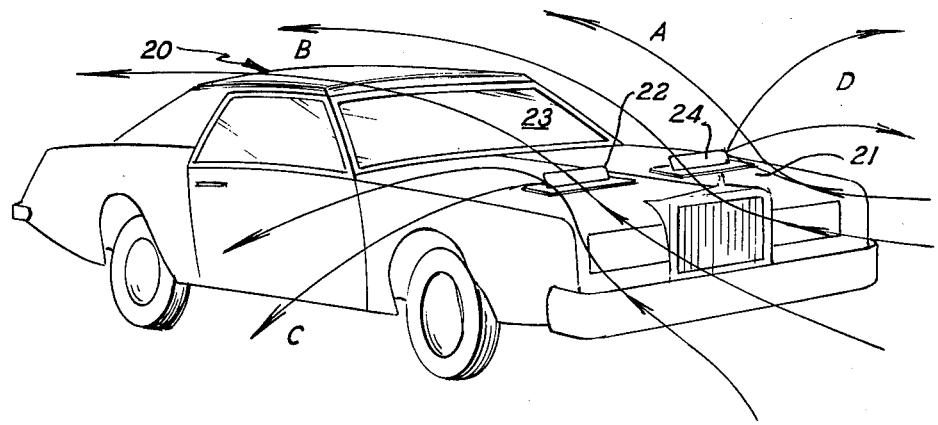
FIG. 1 is a perspective view illustrating a pair of the deflecting devices of the invention in place on a metallic hood of a motor vehicle.

Referring to FIG. 1, there is illustrated generally a motor vehicle 20 having a metallic hood 21. Two bug deflectors 22 and 24 as will be more fully described hereinafter are shown positioned on the hood and also air currents A, B, C, and D, are shown that are produced when the vehicle is in forward motion. The deflecting devices of this invention are adapted to deflect air currents away from the windshield 23. The deflectors 22 and 24 can be easily placed and retained on the hood 21 at positions which produce the optimum deflection of the air currents. Bugs, road grime, etc., carried by the air currents will also be deflected away from the windshield 23. The various embodiments of the bug deflecting devices described hereinafter are all adapted to produce the deflection of air currents. Furthermore, all the embodiments are adapted to be removably mounted on the hood of a vehicle by magnetic means whereby they are retained on the hood even at high speeds of the vehicle.

Figure 2:
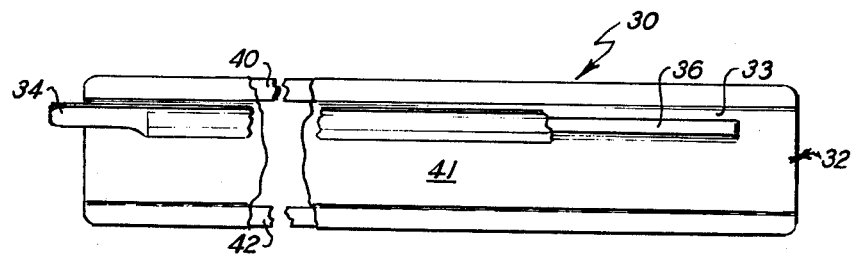
FIG. 2 is a top plan view of one specific embodiment of a deflecting device according to this invention.
Figures 3, 4:
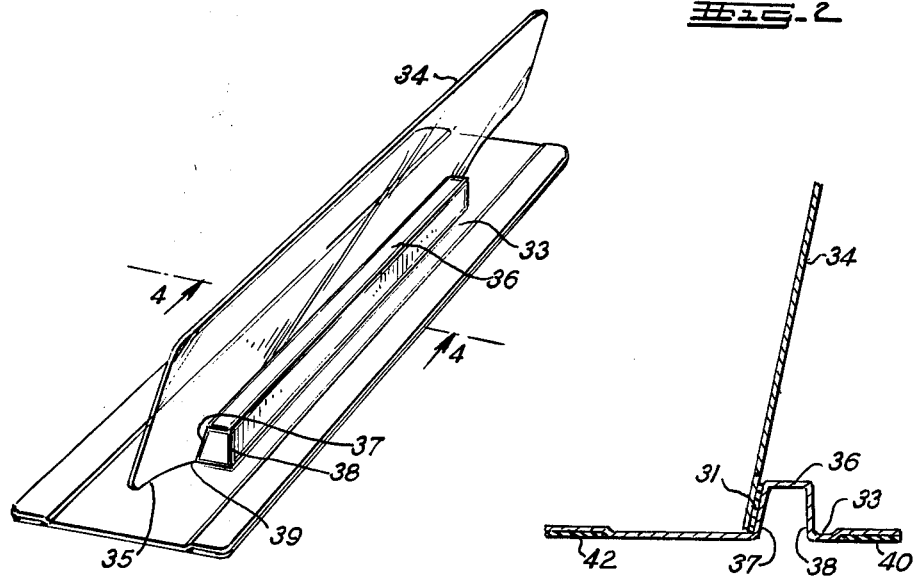
FIG. 3 is a perspective side and rear view of the deflecting device embodiment of FIG. 2.
FIG. 4 is a sectional view taken along line 4—4 of FIG. 3.

FIGS. 2-4 depict a first specific embodiment 30 of a deflecting device according to this invention, which comprises a flexible, semi-rigid base 32 and upright transparent deflector shield 34 canted backwardly. The base 32 is substantially flat and comprises an upstanding member 36, having angled sides 37 and 38, disposed near the rear of the base. The lower portion 39 of the shield is positioned along side 37 of member 36 and secured thereto by suitable means, such as glue or pressure sensitive adhesive tape 31.

The base 32 comprises a pair of semi-rigid, flexible magnetic strip members 40 and 42 secured by suitable means to the front and rear edge portions of the base. The base 32 is molded from a suitable plastic material which provides a semi-rigid, flexible structure. As shown, the magnetic strip members 40 and 42, can be secured to the base during the molding of the base.

Deflector shield 34 is semi-rigid and flexible plastic material, which can flex backwardly, when encountering air currents, about a half inch or more at high vehicle speeds. The flexing of the shield is also accompanied by a flexing backwardly, to a small degree, of the upstanding member 36. Thus, flexing of both the shield and the upstanding member provide a cushioned resistance to the air currents, and the device continues to be held securely to the hood by the magnetic members 40 and 42. The shield, as shown, extends beyond the base 32 and has an overall rectangular configuration. A shield, having dimensions of about 17 inches in length and about 4 to 5 inches wide, was found to be satisfactory although various similar dimensions are also adequate to provide deflection of the air currents. The shield is provided with cutout portions 35 at its bottom edge at both sides, which aid in stabilizing the shield as it encounters the air currents.

The upright member 36 is positioned near the back edge portion and magnetic member 40. A section 33 is provided between the rear portion 38 of upright member 36 and the forward edge of rear magnetic member 40. Forwardly of the upright member, a section 41 is provided between the bottom of shield 34 and front magnetic member 42. Upon encountering any unusually strong air currents at higher speeds, the shield will be flexed backwardly to a position where the front magnetic member 42 will slide along the hood surface a small distance rearwardly. Member 42 will not release from the hood surface during this movement. In so doing, section 41 of the base 32 will buckle upwardly a very small amount and section 33 will flex. When this occurs, the rear magnetic member 40 will remain firm. Even in the buckled and flexed condition of the bug deflecting device, it will operate efficiently in deflecting air currents. Upon stopping the vehicle, the driver can then readjust the device on the hood surface. This design provides for greater stability and secureness in retaining the deflecting device on the hood at all times even at high vehicle speeds and unusually strong momentary air currents.

The magnetic members 40 and 42 are flexible, semi-rigid, strip-type permanent magnets available commercially. These strip magnets are available with various magnetic intensities and comprise permanent magnetic particles embedded and aligned in a molded flexible plastic or rubber carrier material. In order for the magnetic members to make good close contact with the hood surface, the deflecting devices are mounted on smooth even portions of the hood. However, the design of the deflecting device is such that the base 32 can be flexed between the magnetic members so that it can be mounted on longitudinal curved surfaces of a hood, i.e., at the portions where a hood may curve downwardly towards the front grill of the vehicle.

Figure 5:
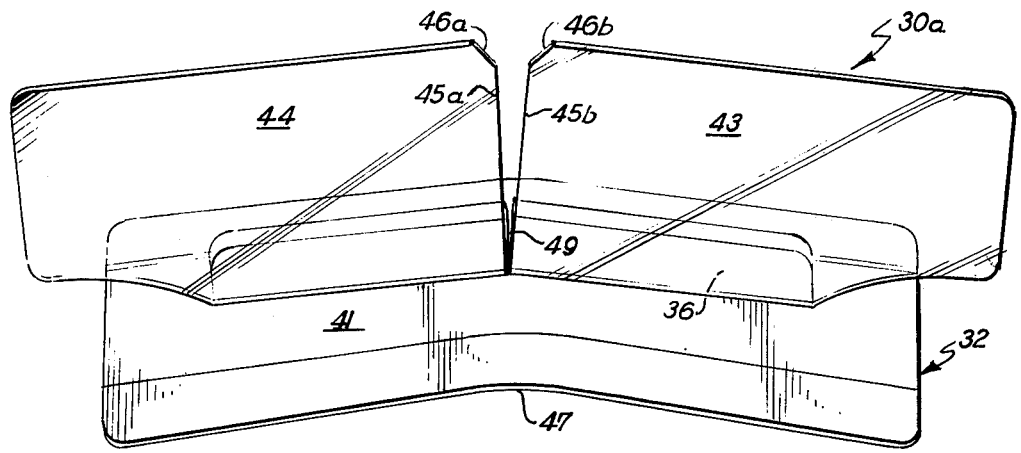
FIG. 5 is a perspective view of a modified embodiment of the deflecting device shown in FIGS. 2-4 in accordance with this invention.
Figure 6:
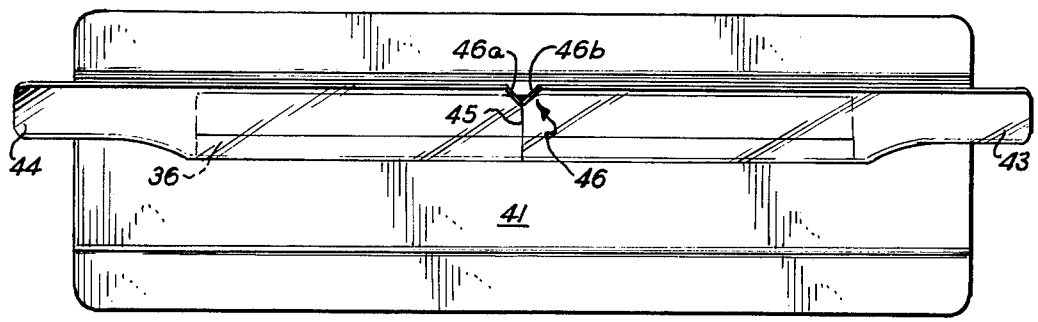
FIG. 6 is a top view of the deflecting device shown in FIG. 5.
Figure 7:
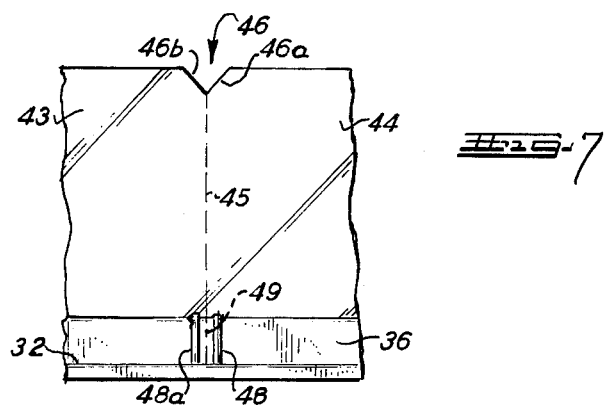
FIG. 7 is a rear fragmentary view of the deflecting device shown in FIG. 6.

Referring to FIGS. 5-7 a modification 30a of the deflector 30 of FIGS. 2-4 is shown. On smaller motor vehicles, where the hood is not particularly wide only one deflecting device need be used, placed at the center of the hood, to protect the windshield. However, many of these vehicles do not have a completely flat design across the hood. Many of these hoods comprise a longitudinal ridge line at their center with both sides of the hood slanting downwardly therefrom. Modification 30a is designed to provide means to permit the deflecting device to straddle the ridge line and permit the magnetic members to still make good and close contact with the hood on both sides of the ridge line.

Modification 30a is in all respects similar in construction to embodiment 30. However, the deflector shield is provided with a V-notch 46 formed by cutting along line 46a and 46b at the center of the shield and the upstanding member 36 is provided with vertical ridges 48 and 48a at its middle rear portion having a portion 49 in vertical alignment with V-notch 46 (see FIG. 7). When a ridge line is encountered on a hood, the deflector shield can be cut vertically along line 45, as well as member 36 through portion 49. Thus, the deflector shield is cut into two sections 43 and 44 and base 32 can flex along 47. The deflecting device can then be mounted on a hood easily straddling a ridge line and permitting the base 32 and the magnetic members to make good contact with the surfaces of the hood.

Referring to FIGS. 8 and 9, a second embodiment 50 of the bug deflecting device is shown which comprises a base 52, deflector shield 54 and upstanding member 56. Base 52 comprises forward ribs 58 and 58a and rear rib 58b. Strip magnetic members 59, 59a and 59b are disposed in ribs 58, 58a and 58b respectively. Shield 54 is secured against the front side 56a of the upstanding member 56. This embodiment provides greater flexing of the shield in accordance with air currents encountered, and provides additional magnetic holding means to retain the deflecting means on the hood.

In FIGS. 10 and 11, a third embodiment 60 is shown having a base 68, shield 64, upstanding member 66 and magnetic members 69 and 69a. Base 68 comprises ribs 67 and 67a, respectively and a series of ribs 68a, 68b, etc. This design provides additional rigidity and strength to the base while providing the required flexability in the upstanding member 66.

In FIGS. 12 and 13, a third embodiment 70 is depicted comprising a base 72 comprising ribs 73 and 73a, a series of ribs 74, 74a, 74b, 74c, etc., and strip magnetic members 75 and 75a, similarly as in embodiment 60. However in this embodiment, upstanding member 76 of the base is low in profile with shield 71 secured thereto at 76a by adhesive means 77 at a more pronounced angle at about 45° from the vertical. This design is for use with vehicles having a low profile, such as sports cars.

In FIG. 14, a fourth embodiment 80 of the bug deflecting device is shown similar to embodiment 60 with magnetic members 85 and 85a except that a series of separate upstanding members 82, 84, and 86 are provided with a lesser number of ribs 87, 87a, 87b, and 87c. This embodiment provides for a deflector which has greater flexibility longitudinally to conform to curved portions of the hood of a vehicle.

In FIG. 15, a fifth embodiment 90 is depicted wherein the shield 92 is capable of being changed in pitch to enable the driver to select an angle to suit the vehicle being driven or the type of driving to be encountered. Thus at lower speeds a more upright pitch is required to deflect the air higher whereas at higher speeds a less upright pitch is required to deflect the air stream. The base 94 comprises magnetic members 95 and 95a and is provided with longitudinal slots 96, 97, and 98. The upstanding member 99 comprises angled front sides 99a, 99b, and 99c. Thus, to provide, for example, a high pitch angle for slower driving, shield 92 is placed in slot 98 and abuts against side 99a. Similarly, if a lower pitch angle is desired, the shield is placed in slot 96 and abuts side 99c. The shield can be permanently mounted in any position desired by adhesive means (not shown). If it is desired to provide changeable pitch means to the shield, the shield can be held in place by Velcro means provided between the angled sides and the shield, or any other suitable releasable means.

It is to be understood that the form of the invention herewith shown and described is to be taken as a preferred example of the same, and that various changes in the shape, size and arrangement of parts may be resorted to, without departing from the spirit of the invention or scope of the subjoined claims.

What is claimed is:

1. A deflecting device for deflecting air currents containing bugs, road grime and the like away from the windshield of a moving motor vehicle, said device adapted to be removably mountable at any position on the hood of any vehicle; said device comprising a generally vertically disposed transparent shield member and a horizontal base member; said shield member and base member being planar, flexible and semi-rigid; said base member comprising a pair of front and rear parallel, semi-rigid, flexible, strip permanent magnets and an upstanding member parallel to and disposed between said magnets and adjacent said rear magnet; said upstanding member having a front face canted backwardly; said shield member permanently secured to said front face of said upstanding member.

2. The deflecting device of claim 1 wherein said shield member comprises a V-slot at its center upper edge and said upstanding member comprises a pair of vertical ridges at the rear center portion thereof in alignment with said V-slot.

* * * * *